Oct. 31, 1939.   R. H. WHITEHEAD   2,178,446
ELECTRIC CLOCK
Filed March 22, 1938   2 Sheets-Sheet 1

INVENTOR
RICHARD H. WHITEHEAD
BY
ATTORNEY

Oct. 31, 1939.  R. H. WHITEHEAD  2,178,446
ELECTRIC CLOCK
Filed March 22, 1938    2 Sheets-Sheet 2

INVENTOR
RICHARD H. WHITEHEAD
BY
ATTORNEY

Patented Oct. 31, 1939

2,178,446

UNITED STATES PATENT OFFICE 2,178,446

ELECTRIC CLOCK

Richard H. Whitehead, New Haven, Conn., assignor to New Haven Clock Company, New Haven, Conn., a corporation of Connecticut Application March 22, 1938, Serial No. 197,334

4 Claims. (Cl. 58—26)

This invention relates to clocks.

It is an object of this invention to provide a clock mechanism with a non-self-starting motor in which the motor mechanism may be automatically brought up to synchronous speed in the normal setting of the clock.

Electric clocks have heretofore consisted generally of two general types: One having a motor adapted to start from rest and come up to synchronous speed when power is applied, the other having no starting torque whatever but adapted to run in synchronism if brought to that speed. The latter type of motor is the simplest to construct and in some respects the most reliable in its operations since it cannot operate either above or below the synchronous speed. Moreover, if power fails in the line for any reason the self-starting motor picks up operation again as soon as the power comes back on the line. The result is that the clock is in full operation but giving a wrong indication of time. The non-self-starting motor is free from this limitation since if it drops out of true-timed relation it stops altogether.

It is a further object of this invention to provide a non-self-starting motor clock which has the simplicity and accuracy characteristic of clocks of that description but free from the necessity of separately starting the motor when the clock is set.

The invention accordingly comprises the features of construction, combination of elements, and arrangements of parts, which will be exemplified in the construction hereinafter set forth and the scope of the application of which will be indicated in the claims.

For a fuller understanding of the nature and objects of the invention, reference should be had to the following detailed description, taken in connection with the accompanying drawings, in which.

Figure 1:
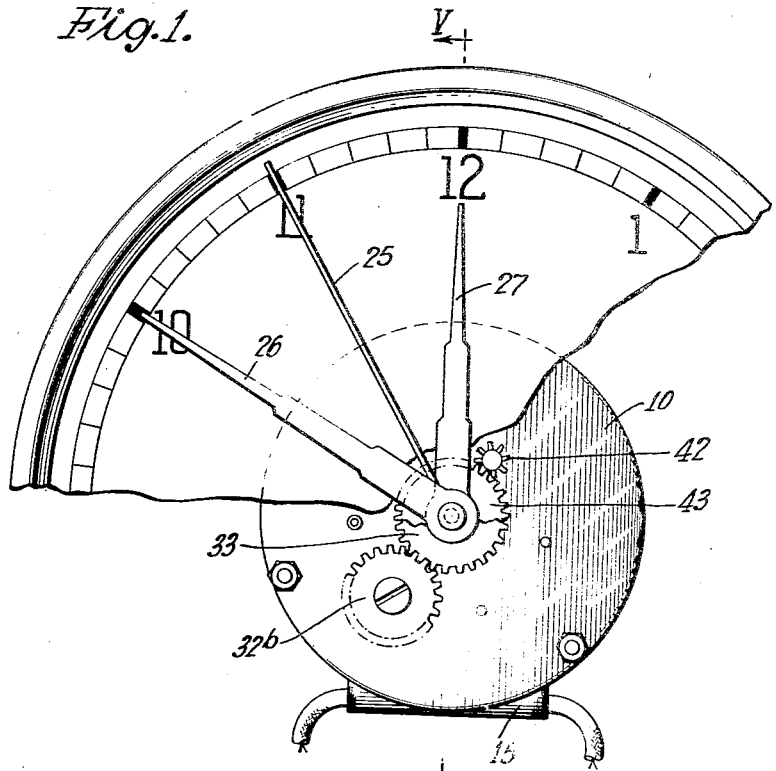
Figure 1 is a front elevation of a clock embodying this invention, the dial being fragmentary.
Figure 2:
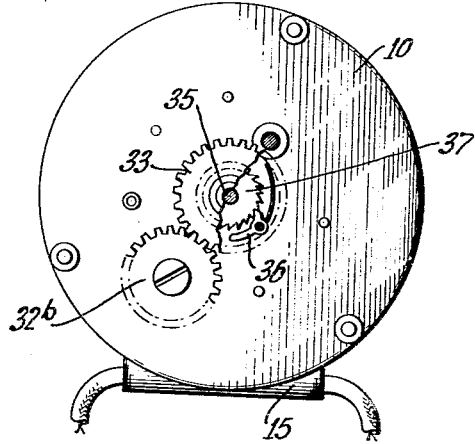
Figure 2 is a section on the line II—II of Figure 4.
Figure 3:
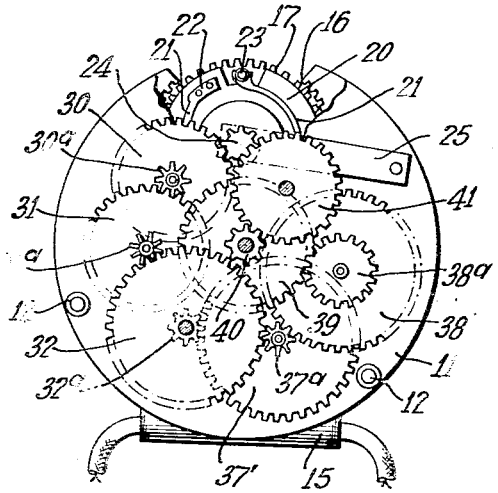
Figure 3 is a section on the line III—III of Figure 4.
Figure 4:
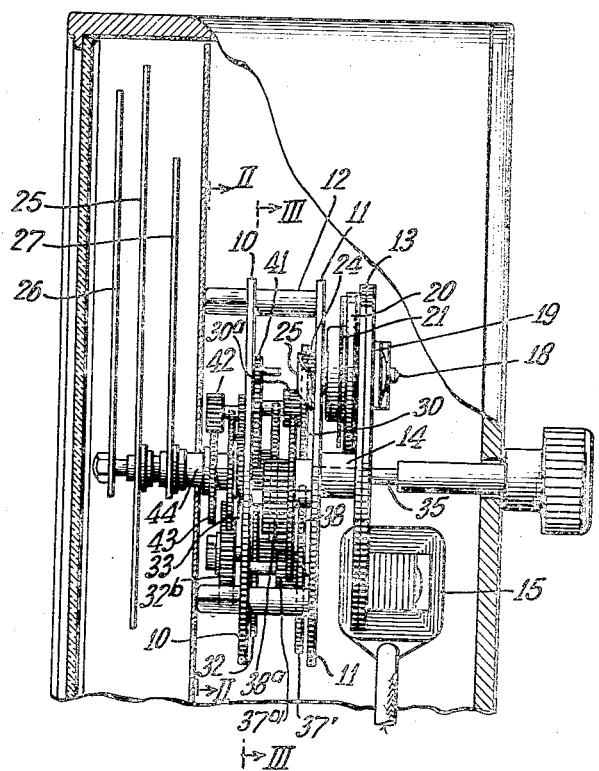
Figure 4 is a side elevation of the clock.
Figure 5:
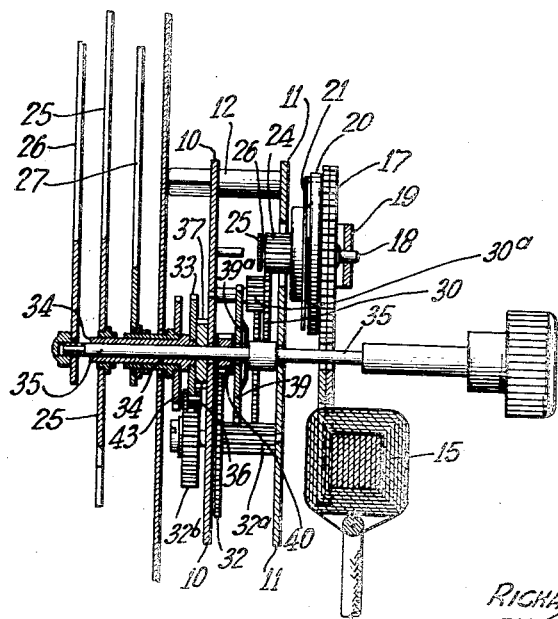
Figure 5 is a central vertical section on the line V—V of Figure 1.

In the drawings the numerals 10 and 11 comprise a pair of supporting plates held apart by studs 12 to carry the time train gears. The motor itself comprises a magnetic plate 13 held in spaced relation with the plates 10 and 11 by studs 14 carrying at its lower end a magnetic coil 15 and having at its upper end a serrated opening 16 in which is rotatably mounted a serrated rotor 17, upon a shaft 18 fixed in a non-magnetic bridge 19, bridging the opening 16, the teeth of the rotor and of the serrated opening having the same angular spacing so that they would come into registry with each other at the same time. A synchronizing balance wheel 20 is mounted on the shaft 18 adjacent to the rotor 17 and is connected thereto by a spring 21 attached to the balance wheel at one end, as shown at 22, and having its other end engaging a pin 23 fast upon the rotor. The drive pinion 24 for the clock movement is fast upon the balance wheel 20. A leaf spring 25 bears against a central projection 26 upon the pinion to hold the parts in place upon the shaft 18. This construction forming a well-known type of non-self starting synchronous motor which comprises no particular part of this invention.

The clock train comprises primarily a train of reduction gearing connecting the synchronous motor to the hands.

Such a train ordinarily provides one gear operating a speed of one revolution per minute and connecting gearing driving the minute hand at one revolution per hour and the hour hand at one revolution for each twelve hours. The latter hands being driven through some form of friction drive so that the hands may be set independent of the movement of the motor.

Such clocks have required some auxiliary means to start the rotor to bring it into synchronism whenever it stops and this is in addition to the mechanism for re-setting the clock and ordinarily requires a separate knob on the outside of the case for the purpose.

In accordance with this invention I have found that the starting of such a clock could be accomplished by a single operation by directly connecting the hand setting mechanism with the rotor by a gear train having a speed ratio much less than the normal time train between the elements whereby the setting of the clock hands at the normal rate of speed will automatically bring the rotor up to synchronous speed.

I have found that the second hand which is, of course, connected from the rotor by a much lower speed reduction than the minute hand may be rotated to drive the rotor at synchronous speed while at the same time the minute hand is moved at the rate of speed ordinarily used in setting the clock.

The purpose of this invention may be accomplished by connecting the minute hand to the rotor for time driving through the medium of a friction drive or ratchet and by also providing a ratchet mechanism between the minute hand and the second hand such that when the minute hand is moved forwardly the ratchet picks up the second hand and carries it with it.

To facilitate this connection I prefer to re-arrange the gears, placing the second hand in between the minute hand and the hour hand.

In the drawings this is shown as follows:

The clock is provided with a second hand 25, a minute hand 26 and an hour hand 27. These elements are driven from the rotor 17 as follows:

Pinion 24 drives a gear 30 carrying a pinion 30a which in turn drives a gear 31 carrying a pinion 31a in mesh with a gear 32 which carries a pinion 32a connected, as will be described, to drive the minute hand. The gear 32 also carries another gear 32b upon the upper face of the plate 10 which meshes with the gear 33 fast upon a hollow shaft 34 concentric about the minute or central shaft 35 and carrying the second hand 25.

The gear 33 carries a pawl 36 rotating upon a ratchet wheel 37 fast upon the minute wheel shaft 35. The direction of the ratchet being such that the gear 33 may drive the second hand shaft 34 faster than the central or minute shaft 35 by the pawl rotating over the ratchet, but the turning of the minute hand shaft in a clockwise direction will pick up the ratchet and carry the second hand with it.

The pinion 32a meshes with gear 37' carrying pinion 37a which meshes with gear 38 carrying pinion 38a. The pinion 38a meshes with the gear 39 frictionally mounted on the minute wheel shaft 35 by a friction spring 39a. The minute shaft 35 also carries a fixed pinion 40 which meshes with the hour hand reduction gear 41 carrying a pinion 42 rotating a gear 43 on a hollow shaft 44 mounted upon the hollow shaft 34 and carrying the hour hand 27.

This construction normally drives the hands through the gears as above described, but whenever the minute shaft 34 is turned to set the clock the friction connection between the gear 39 and the shaft 35 slips and the ratchet and ratchet wheel 36 and 37 engage to carry the second hand with the minute hand, directly driving the rotor through the gears 32b, 32, 31a, 31, 30a, 30 and 24. This gear reduction is such that the normal setting of the clock will move the rotor at just about or a little faster than the synchronous running speed of the rotor and thus as soon as the clock has been set, the rotor drops back into synchronous speed and continues in motion.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In an electric clock having a non-self-starting motor having a rotor and indicating hands to be driven by such rotor in combination, a train of gears connected to said rotor having a speed reduction ratio to drive the hands to indicate time and including a slip member and a one-way drive connection between said hands and a part of said gear train on the rotor side of said slip member for rotating the rotor when said hands are set forward, said one-way drive being adapted to drive said rotor with a gear reduction of less ratio than the time indicating gear ratio.

2. In an electric clock having a non-self-starting motor having a rotor and indicating hands to be driven by said rotor in combination, a train of reduction gears connected to said rotor having a speed reduction ratio to drive the hands to indicate time including a slip member, and a ratchet connection between said hands and an intermediate portion of said gear train between the slip member and the rotor whereby the setting of the hands forward will rotate the rotor through a gear train having a less reduction ratio than the time indicating reduction ratio.

3. In an electric clock having a non-self-starting motor having a rotor and indicating second, minute and hour hands in combination, a train of reduction gears connected to said rotor having a speed reduction ratio to drive the second hand to indicate seconds, a gear train including a slip member for driving said minute hand to indicate minutes and a ratchet device for connecting said minute hand to said first mentioned gear train, whereby the setting of the minute hand forward will directly drive said rotor through said first mentioned gear train by slippage in said friction drive.

4. In an electric clock having a non-self-starting motor having a rotor and indicating hands to be driven by said rotor, a shaft for carrying one of said hands, in combination, a gear loosely mounted upon said shaft, a gear connection between said rotor and said gear to drive the same slower than said rotor and a second gear connection including a slip device between said gear and said shaft to drive the shaft slower than the gear and a ratchet connection between said shaft and said gear whereby said shaft may move said gear forward in unison with itself but may be driven forward by the said rotor at a rate slower than said gear, the arrangement being such that the manual forward movement of said shaft will drive said rotor forward to start the same.

RICHARD H. WHITEHEAD.